(12) United States Patent
Spangler et al.

(10) Patent No.: US 10,940,549 B2
(45) Date of Patent: Mar. 9, 2021

(54) KEY DUPLICATION MACHINE HAVING USER-BASED FUNCTIONALITY

(71) Applicant: THE HILLMAN GROUP, INC., Cincinnati, OH (US)

(72) Inventors: Todd Spangler, Mesa, AZ (US); Michael Burkett, Tampa, FL (US); Jordan Shoenhair, Tempe, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

(21) Appl. No.: 16/858,844

(22) Filed: Apr. 27, 2020

(65) Prior Publication Data

US 2020/0254537 A1    Aug. 13, 2020

Related U.S. Application Data

(63) Continuation of application No. 16/186,524, filed on Nov. 10, 2018, now Pat. No. 10,668,543, which is a (Continued)

(51) Int. Cl.
*B23C 3/35* (2006.01)
*G06Q 20/18* (2012.01)
*G07F 11/70* (2006.01)

(52) U.S. Cl.
CPC ............... *B23C 3/35* (2013.01); *G06Q 20/18* (2013.01); *G07F 11/70* (2013.01); (Continued)

(58) Field of Classification Search
CPC . Y10T 409/300952; Y10T 409/301008; Y10T 409/301064; G05B 2219/45245; (Continued)

(56) References Cited

U.S. PATENT DOCUMENTS 488,058 A    12/1892 Breed
1,135,676 A    4/1915 Engelbert
(Continued)

FOREIGN PATENT DOCUMENTS

CA    2365738 A1    9/2000
DE    102005027102 A1    12/2006
(Continued)

OTHER PUBLICATIONS

International Search Report dated Nov. 12, 2014 listing PCT/US2014/049740 filed Aug. 5, 2014.
(Continued)

*Primary Examiner* — Erica E Cadugan
*Assistant Examiner* — Michael Vitale
(74) *Attorney, Agent, or Firm* — Finnegan, Henderson, Farabow, Garrett & Dunner, LLP

(57) ABSTRACT

A machine is disclosed for use in duplicating features of an existing key within a key blank. The machine may have an identification module configured to capture data associated with the features of the existing key, a fabrication module configured to cut the features in the key blank based on the data, a user input device, and a controller in communication with the identification module, the fabrication module, and the user input device. The controller may be configured to regulate operation of the identification module and the fabrication module, and to receive input from a user via the user input device. The input may be indicative of the user being a first type of user or a second type of user. The controller may also be configured to selectively implement one of a first mode of operation or a second mode of operation based on the input.

19 Claims, 5 Drawing Sheets

Related U.S. Application Data continuation of application No. 15/414,323, filed on Jan. 24, 2017, now Pat. No. 10,124,420.

(60) Provisional application No. 62/292,671, filed on Feb. 8, 2016.

(52) U.S. Cl.
CPC ...... *B23C 2235/12* (2013.01); *B23C 2235/41* (2013.01); *G05B 2219/45245* (2013.01); *Y10T 409/300952* (2015.01)

(58) Field of Classification Search
CPC .......... G06Q 20/18; B23C 3/35; B23C 3/355; B23C 2235/12; B23C 2235/41
USPC ............................ 409/81, 82, 83; 700/17, 18
See application file for complete search history.

(56) References Cited

U.S. PATENT DOCUMENTS

| | | |
|---|---|---|
| 1,165,099 A | 12/1915 | Hoernel |
| 1,243,810 A | 10/1917 | Christoph |
| 1,400,678 A | 12/1921 | Holbrook |
| 1,422,155 A | 7/1922 | Wetherholt |
| 1,462,150 A | 7/1923 | Segal |
| 1,587,181 A | 6/1926 | Pomeroy et al. |
| 1,614,852 A | 1/1927 | Scharf |
| 1,656,295 A | 1/1928 | Schechter |
| 1,697,747 A | 1/1929 | Bachmann |
| 1,752,668 A | 4/1930 | Johnson |
| 1,800,209 A | 4/1931 | Christopherson |
| 1,811,922 A | 6/1931 | Falk |
| 1,869,631 A | 8/1932 | Swanson |
| 2,095,196 A | 10/1937 | Paquette |
| 2,148,667 A | 2/1939 | Yoskowitz et al. |
| 2,682,809 A | 7/1954 | May |
| 2,712,769 A | 7/1955 | Prescott |
| 2,821,064 A | 1/1958 | Nelson |
| 3,116,665 A | 1/1964 | Reisner |
| 3,265,245 A | 8/1966 | Harden |
| 3,323,420 A | 6/1967 | Roxburgh |
| 3,358,561 A | 12/1967 | Roxburgh et al. |
| 3,413,892 A | 12/1968 | Casey et al. |
| 3,442,174 A | 5/1969 | Weiner et al. |
| 3,496,636 A | 2/1970 | Lieptz |
| 3,602,092 A | 8/1971 | Richens |
| 3,682,041 A | 8/1972 | Essig |
| 3,748,940 A * | 7/1973 | Muri ................. B21D 53/42 83/414 |
| 3,780,550 A | 12/1973 | Simorghi |
| 3,796,130 A | 3/1974 | Gartner |
| 3,797,291 A | 3/1974 | Simorghi |
| 3,865,011 A | 2/1975 | Patriquin |
| 3,978,764 A | 9/1976 | Patriquin |
| 4,055,880 A | 11/1977 | Moessner |
| 4,159,783 A | 7/1979 | Crasnianski |
| 4,235,087 A | 11/1980 | Bianchi |
| 4,294,096 A | 10/1981 | Heimann |
| 4,666,351 A | 5/1987 | Marchal |
| 4,741,652 A | 5/1988 | Marchal |
| 4,752,876 A | 6/1988 | Couch et al. |
| 4,899,391 A | 2/1990 | Cimino et al. |
| 4,901,548 A | 2/1990 | Deslandes |
| 5,167,171 A | 12/1992 | Heredia |
| 5,172,829 A | 12/1992 | Dellicker, Jr. |
| 5,351,409 A | 10/1994 | Heredia |
| 5,383,345 A | 1/1995 | Kallinger-Prskawetz-Jacobsen |
| 5,443,339 A | 8/1995 | Heredia et al. |
| 5,496,138 A | 3/1996 | Drori |
| 5,538,374 A | 7/1996 | Cole et al. |
| 5,538,534 A | 7/1996 | Cole et al. |
| 5,546,316 A | 8/1996 | Buckley et al. |
| 5,556,240 A | 9/1996 | Almblad |
| 5,569,003 A | 10/1996 | Goldman et al. |
| 5,607,267 A | 3/1997 | Heredia et al. |
| 5,617,323 A * | 4/1997 | Stansberry ............ G01B 7/287 235/375 |
| 5,660,509 A | 8/1997 | Cole et al. |
| 5,671,523 A | 9/1997 | Juchinewicz |
| 5,676,504 A | 10/1997 | Mueller et al. |
| 5,711,643 A | 1/1998 | Parr et al. |
| 5,739,766 A | 4/1998 | Chaloux |
| 5,764,156 A | 6/1998 | Chaloux |
| 5,771,176 A | 6/1998 | Froehlich et al. |
| 5,807,042 A | 9/1998 | Almblad et al. |
| 5,833,406 A | 11/1998 | Chies et al. |
| 5,844,808 A | 12/1998 | Konsmo et al. |
| 5,906,365 A | 5/1999 | Wu |
| 5,908,273 A | 6/1999 | Titus et al. |
| 5,951,218 A | 9/1999 | Wu |
| 5,956,985 A | 9/1999 | Chang |
| 5,964,554 A | 10/1999 | Drori |
| 5,974,844 A | 11/1999 | Harrelson et al. |
| 5,997,224 A | 12/1999 | Beauregard et al. |
| 6,064,747 A | 5/2000 | Wills et al. |
| 6,065,911 A | 5/2000 | Almblad et al. |
| 6,106,131 A | 8/2000 | Hao |
| 6,152,662 A | 11/2000 | Titus et al. |
| 6,185,311 B1 | 2/2001 | Yanovsky et al. |
| 6,237,756 B1 | 5/2001 | Caudle |
| 6,371,286 B1 | 4/2002 | Montanari |
| 6,406,227 B1 | 6/2002 | Titus et al. |
| 6,449,381 B1 | 9/2002 | Yanovsky et al. |
| 6,543,972 B1 | 4/2003 | Cimino |
| D475,195 S | 6/2003 | Christianson |
| 6,588,995 B2 | 7/2003 | Wills et al. |
| 6,595,045 B1 | 7/2003 | Fuglewicz et al. |
| 6,602,030 B1 | 8/2003 | Markbreit |
| 6,641,339 B2 | 11/2003 | Chies et al. |
| 6,647,308 B1 | 11/2003 | Prejean |
| 6,651,470 B1 | 11/2003 | Rafter |
| 6,684,673 B2 | 2/2004 | Florendo |
| 6,687,565 B2 * | 2/2004 | Wetterlin ................. B23C 3/35 409/81 |
| 6,782,725 B2 | 8/2004 | Linares |
| 6,801,829 B2 | 10/2004 | Kawai |
| 6,839,449 B1 | 1/2005 | Campbell et al. |
| 6,892,558 B2 | 5/2005 | Chodosh |
| 6,895,100 B1 | 5/2005 | Pacenzia et al. |
| 7,055,352 B2 | 6/2006 | Meyerson et al. |
| 7,077,607 B2 | 7/2006 | Foscan |
| 7,167,892 B2 | 1/2007 | Defosse et al. |
| 7,214,011 B2 | 5/2007 | Ryai, Sr. et al. |
| 7,380,428 B2 | 6/2008 | Morehart et al. |
| 7,387,476 B2 | 6/2008 | Ryai, Sr. |
| 7,527,458 B2 | 5/2009 | Ryai, Sr. et al. |
| D618,983 S | 7/2010 | Downes |
| 7,890,878 B2 | 2/2011 | Bass et al. |
| 7,891,919 B2 | 2/2011 | Bass et al. |
| 7,918,629 B2 | 4/2011 | Belflower et al. |
| 8,074,481 B2 | 12/2011 | Bass et al. |
| 8,126,764 B2 | 2/2012 | Murray et al. |
| 8,128,322 B2 | 3/2012 | Bass et al. |
| 8,142,117 B2 | 3/2012 | Belflower et al. |
| 8,191,779 B2 | 6/2012 | Illingworth et al. |
| 8,214,247 B2 | 7/2012 | Murray et al. |
| 8,215,625 B2 | 7/2012 | Wu |
| 8,225,696 B2 | 7/2012 | Downes |
| 8,287,215 B2 | 10/2012 | Freeman et al. |
| 8,292,556 B2 | 10/2012 | Ryai, Sr. et al. |
| D674,590 S | 1/2013 | Busch |
| 8,342,783 B2 | 1/2013 | Ryai, Sr. |
| 8,373,558 B2 | 2/2013 | Sagady et al. |
| 8,484,068 B2 | 7/2013 | Godwin et al. |
| 8,484,070 B2 | 7/2013 | Murray et al. |
| 8,532,809 B2 | 9/2013 | Freeman |
| 8,600,546 B1 | 12/2013 | Hagen et al. |
| 8,626,331 B2 | 1/2014 | Marsh et al. |
| 8,634,951 B2 | 1/2014 | Freeman |
| 8,682,468 B2 * | 3/2014 | Marsh ................ G05B 15/02 700/186 |
| 8,992,145 B1 | 3/2015 | Mueller et al. |
| 9,073,133 B1 | 7/2015 | Mueller et al. |

(56) References Cited

U.S. PATENT DOCUMENTS

| | | | |
|---|---|---|---|
| 9,149,877 B1 | 10/2015 | Mueller et al. | |
| 9,243,426 B2 | 1/2016 | Gerlings et al. | |
| 9,468,982 B1 | 10/2016 | Mueller et al. | |
| 9,487,968 B2 | 11/2016 | Gerlings | |
| 9,506,272 B2 | 11/2016 | Gerlings et al. | |
| 9,556,649 B1 | 1/2017 | Mueller et al. | |
| 9,558,236 B1 | 1/2017 | Hagen et al. | |
| 9,563,885 B2 * | 2/2017 | Marsh | G06Q 20/18 |
| 9,580,932 B2 | 2/2017 | Gerlings et al. | |
| 9,586,272 B1 | 3/2017 | Mueller et al. | |
| 9,764,393 B2 | 9/2017 | Mueller et al. | |
| 9,797,163 B2 | 10/2017 | Grice et al. | |
| 10,124,420 B2 | 11/2018 | Spangler et al. | |
| 2002/0022901 A1 | 2/2002 | Wetterlin et al. | |
| 2002/0031251 A1 | 3/2002 | Campbell et al. | |
| 2002/0141843 A1 | 10/2002 | Mueller et al. | |
| 2002/0191849 A1 * | 12/2002 | Campbell | G06K 9/2036 |
| | | | 382/181 |
| 2004/0148988 A1 | 8/2004 | Taylor | |
| 2004/0253067 A1 | 12/2004 | Bosch | |
| 2005/0241353 A1 | 11/2005 | Moening | |
| 2006/0044109 A1 | 3/2006 | Griffits et al. | |
| 2006/0048553 A1 | 3/2006 | Almquist | |
| 2006/0051173 A1 | 3/2006 | Foscan | |
| 2006/0090528 A1 | 5/2006 | Moening | |
| 2006/0212398 A1 | 9/2006 | Seliber | |
| 2007/0003388 A1 * | 1/2007 | Doong | B23P 15/005 |
| | | | 409/82 |
| 2007/0224008 A1 | 9/2007 | Bass et al. | |
| 2008/0145163 A1 | 6/2008 | Freeman et al. | |
| 2009/0074528 A1 | 3/2009 | Hadad | |
| 2009/0228795 A1 | 9/2009 | Bass et al. | |
| 2010/0052234 A1 | 3/2010 | Ryai, Sr. | |
| 2010/0278437 A1 | 11/2010 | Thompson et al. | |
| 2010/0278438 A1 | 11/2010 | Thompson et al. | |
| 2010/0316250 A1 | 12/2010 | Perrigo | |
| 2011/0110741 A1 | 5/2011 | Huss et al. | |
| 2011/0167377 A1 | 7/2011 | Bass et al. | |
| 2011/0176881 A1 | 7/2011 | Bass et al. | |
| 2011/0262240 A1 | 10/2011 | Mutch et al. | |
| 2011/0297691 A1 | 12/2011 | Freeman | |
| 2011/0301738 A1 | 12/2011 | Freeman | |
| 2012/0014762 A1 | 1/2012 | Ryai, Sr. et al. | |
| 2012/0038453 A1 | 2/2012 | Bass et al. | |
| 2012/0154127 A1 | 6/2012 | Donadini | |
| 2012/0213603 A1 | 8/2012 | Bass et al. | |
| 2012/0243957 A1 | 9/2012 | Drake et al. | |
| 2013/0017030 A1 | 1/2013 | Freeman et al. | |
| 2013/0039714 A1 | 2/2013 | Ryai, Sr. et al. | |
| 2013/0094918 A1 | 4/2013 | Ryai, Sr. | |
| 2013/0170693 A1 | 7/2013 | Marsh et al. | |
| 2013/0294857 A1 | 11/2013 | Bass et al. | |
| 2013/0331976 A1 | 12/2013 | Freeman et al. | |
| 2014/0113683 A1 | 4/2014 | Hickey | |
| 2014/0314508 A1 * | 10/2014 | Seriff | G06K 9/4685 |
| | | | 409/81 |
| 2014/0377027 A1 | 12/2014 | Burkett et al. | |
| 2015/0050094 A1 | 2/2015 | Gerlings | |
| 2016/0004892 A1 | 1/2016 | Marsh et al. | |
| 2016/0114412 A1 | 4/2016 | Bosch | |
| 2016/0321632 A1 | 11/2016 | Moore et al. | |
| 2016/0346847 A1 | 12/2016 | Gerlings | |
| 2017/0008096 A1 | 1/2017 | Mueller et al. | |
| 2017/0100785 A1 | 4/2017 | Hagen et al. | |
| 2017/0103516 A1 | 4/2017 | Mueller et al. | |
| 2017/0136557 A1 | 5/2017 | Huss et al. | |
| 2018/0010364 A1 | 1/2018 | Grice et al. | |
| 2018/0071838 A1 | 3/2018 | Gerlings et al. | |

FOREIGN PATENT DOCUMENTS

| | | |
|---|---|---|
| DE | 202012100455 U1 | 3/2012 |
| EP | 0362007 A2 | 4/1990 |
| EP | 0709154 | 5/1996 |
| EP | 1338732 | 8/2003 |
| EP | 2000303 | 12/2008 |
| EP | 2517826 | 10/2012 |
| GB | 191403275 A | 6/1914 |
| GB | 2276106 A | 9/1994 |
| WO | WO 89/012867 | 12/1989 |
| WO | WO 93/006959 | 4/1993 |
| WO | WO 02/001480 | 1/2002 |
| WO | WO 02/101180 A2 | 12/2002 |
| WO | WO 2007/093982 | 8/2007 |

OTHER PUBLICATIONS

International Preliminary Report on Patentability dated Feb. 16, 2016 listing PCT/US2014/049740 filed Aug. 5, 2014.

International Search Report dated Nov. 12, 2014 listing PCT/US2014/049901 filed Aug. 6, 2014.

International Preliminary Report on Patentability dated Feb. 16, 2016 listing PCT/US2014/049901 filed Aug. 6, 2014.

International Search Report dated Nov. 12, 2014 listing PCT/US2014/050047 filed Aug. 7, 2014.

International Preliminary Report on Patentability dated Feb. 16, 2016 listing PCT/US2014/050047 filed Aug. 7, 2014.

"Green Curtain Projects Confidential", Dec. 2009.

Office Action in U.S. Appl. No. 15/235,361 dated Feb. 22, 2018; 7 pages.

* cited by examiner

KEY DUPLICATION MACHINE HAVING USER-BASED FUNCTIONALITY

RELATED APPLICATIONS

This application is a continuation application under 35 U.S.C. § 120 of U.S. patent application Ser. No. 16/186,524, filed Nov. 10, 2018, which is a continuation application of U.S. application Ser. No. 15/414,323, filed Jan. 24, 2017, which claims the benefit of priority to U.S. Provisional Application No. 62/292,671 filed on Feb. 8, 2016, the entire contents of all of which are expressly incorporated herein by reference.

TECHNICAL FIELD

The present disclosure is directed to a key duplication machine and, more particularly, to a key duplication machine having user-based functionality.

BACKGROUND

An existing key can be duplicated in any number of different ways, by measuring a profile of the existing key and duplicating that profile within a corresponding key blank. The key blank generally has a size and shape larger than the master key, so that the key blank can be machined (e.g., cut and/or milled down) to function like the existing key. In general, keys can be divided into two different categories, including a transponder category and a non-transponder category.

Transponder keys are most common among newer automobiles, but may also be available for commercial and residential building locks. A transponder key has an rf transmitter imbedded therein, which generates a signal used to disarm an associated security system. The signal generated by each rf transmitter is unique and matched to the specific key housing the transponder. Accordingly, when a transponder key is to be duplicated, the corresponding key blank must also include a transponder encoded the same as the master key. Non-transponder keys are most common among older automobiles and conventional building locks. In general, transponder keys are more expensive and difficult to duplicate, because of the inclusion of the rf transmitter.

Key duplication machines are used to create copies of existing keys. Two different types of duplication machines are in use today by two different types of users. The first type of duplication machine is a self-service vending machine intended for direct use by a customer. The vending machine is capable of duplicating a few of the most common and simple types of keys, when the customer inserts an existing key and payment into the machine. No training is required for use of the vending machine, but the selection and complexity of keys that can be duplicated by the vending machine are limited to the inventory of key blanks stored inside the vending machine. In most instances, transponder keys (i.e., the types of keys having imbedded rf transmitters) cannot be duplicated by the vending machine. This is because transponder keys are more expensive than other types of keys, and a miscut or incorrect coding of a transponder key can be costly for the vending machine owner. In addition, problems experienced during duplication of transponder keys could deter customers from future use of the vending machine.

The second type of duplication machine is a manually operated machine intended for use by a retail store sales employee. The manually operated machine is capable of duplicating a wide variety and complexity of keys, and uses jigs, pattern followers, or punches to produce a new key using a corresponding key blank selected and secured by the store employee. Training is typically provided for use of the manually operated machine, but the selection and complexity of keys that can be duplicated by the manually operated machine is quite broad. For example, a transponder key can be duplicated by a store employee using the manually operated machine.

Although the two types of key duplication machines discussed above may be acceptable for some environments, they can also be problematic. In particular, having only one type of machine is a sales environment can limit the number and type of customers attracted to the environment. However, having both types of machines in the sales environment can consume valuable floor space and increase equipment and operating costs.

The disclosed key duplication machine is directed to overcoming one or more of the problems set forth above and/or other problems of the prior art.

SUMMARY

In one aspect, the present disclosure is directed to a machine for duplicating features of an existing key in a key blank. The machine may include an identification module configured to capture data associated with the features of the existing key, a fabrication module configured to cut the features in the key blank based on the data, a user input device, and a controller in communication with the identification module, the fabrication module, and the user input device. The controller may be configured to regulate operation of the identification module and the fabrication module, and to receive input from a user via the user input device. The input may be indicative of the user being a first type of user or a second type of user. The controller may also be configured to selectively implement one of a first mode of operation or a second mode of operation based on the input identifying a type of the user.

In another aspect, the present disclosure is directed to another machine for duplicating features of an existing key in a key blank. This machine may include an identification module configured to capture data associated with the features of the existing key, a fabrication module configured to cut the features in the key blank based on the data, a user input device, and a transponder encoder. The machine may also include a controller in communication with the identification module, the fabrication module, the user input device, and the transponder encoder. The controller may be configured to regulate operation of the identification module and the fabrication module, and to receive input from a user via the user input device. The input may be indicative of the user being a customer or a store employee. The controller may further be configured to selectively allow encoding and fabrication of the features in the key blank only when the input indicates the user is a store employee.

In yet another aspect, the present disclosure is directed to another machine for duplicating features of an existing key in a key blank. This machine may include an identification module configured to capture data associated with the features of the existing key, a fabrication module configured to cut the features in the key blank based on the data, a user input device, a display, and a reader configured to read an index associated with the key blank. The machine may also include a controller in communication with the identification module, the fabrication module, the user input device, the display, and the reader. The controller may be configured to regulate operation of the identification module and the fabrication module, and receive input from a user via the user input device. The input may be indicative of the user being a customer or a store employee. The controller may also be configured to instruct the user via the display to select the key blank from among a plurality of available key blanks based on the data captured by the identification module, and to instruct the user to pass the index associated with the key blank in proximity to the reader. When the input indicates the user is a customer, the controller is further configured to determine a cost associated with duplicating the existing key based on the signals from the reader. The controller is additionally configured to allow the fabrication module to cut the features in the key blank regardless of payment being received only when the input indicates the user is a store employee.

In still another aspect, the present disclosure is directed to a method of duplicating features of an existing key within a key blank. The method may include capturing data associated with the features of the existing key, and fabricating the features in the key blank based on the data. The method may also include receiving input from a user indicative of the user being a customer or a store employee, and selectively implementing one of a first mode of operation or a second mode of operation based on the input identifying a type of the user.

DETAILED DESCRIPTION

Figure 1:
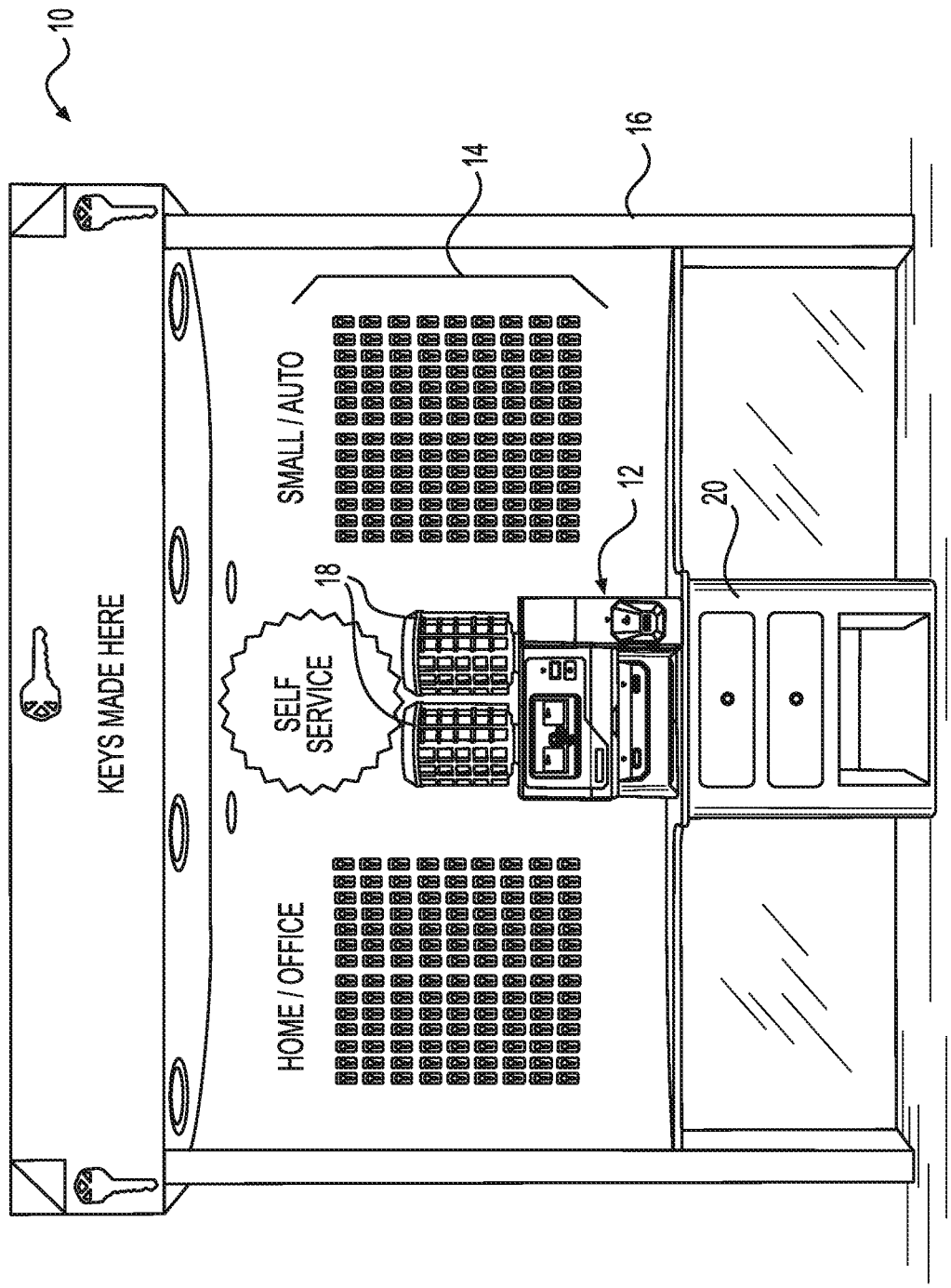
FIG. 1 is an isometric view illustration of an exemplary key duplication center.

FIG. 1 illustrates an exemplary key making center ("center") 10 that can be used to fabricate a copy of an existing key from a corresponding key blank. Center 10 may include, among other things, a key making machine ("machine") 12, and an inventory 14 of key blanks that are stored outside of machine 12. In the disclosed embodiment, inventory 14 includes key blanks arranged by type, size, and/or identification number on a wall 16 behind machine 12, in one or more carousels 18 located on top of machine 12, and/or in a cabinet 20 below machine 12. It is contemplated that the key blanks may be organized and displayed in any manner known in the art. It is important only to note that the key blanks are maintained outside of machine 12 and are manually retrievable for use within machine 12 during a key duplication process.

Figure 2:
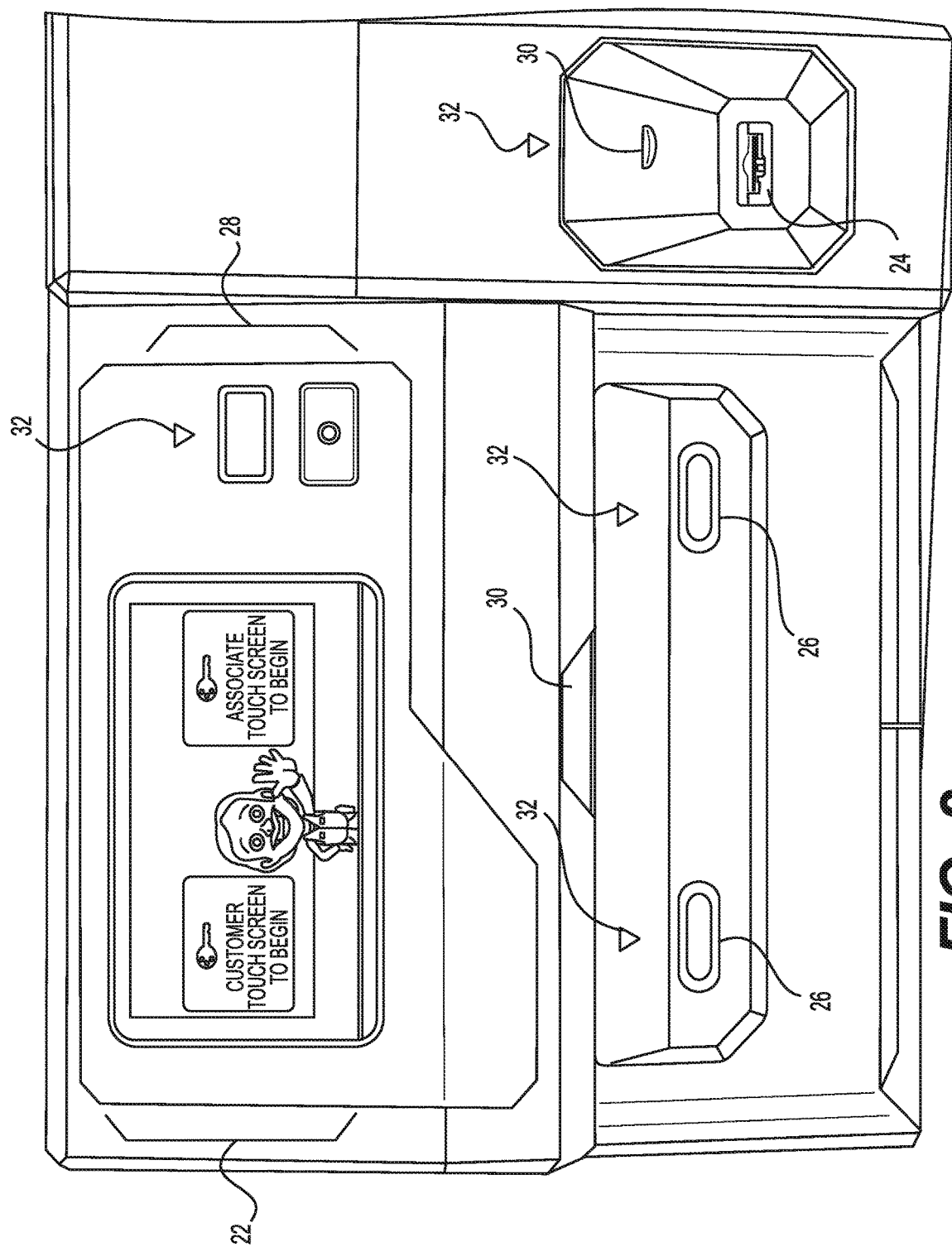
FIG. 2 is an isometric view illustration of an exemplary key duplication machine that forms a portion of the center of FIG. 1.

As shown in FIG. 2, machine 12 may be designed for human interaction during the key duplication process. In particular, machine 12 may have a centralized display 22, a key blank slot ("slot") 24, one or more existing key slots ("slots") 26, a transponder section 28, and a reader 30. Following queues provided via display 22, a user may insert an existing key into slot 24 for identification and/or data capturing, and then insert a corresponding key blank manually retrieved from inventory 14 into slot 26 for fabrication. Transponder section 28 may be used to detect and/or program transponders embedded within the existing key and/or the key blank. Reader 30 may be used to confirm that a manually retrieved key blank is the correct key blank corresponding to the existing key, and/or to charge the user for the key duplication process. One of more of slot 24, slot(s) 26, transponder section 28, and reader 30 may be provided with an indicator light 32 in close proximity that provides additional queues to the user of machine 12.

Figure 3:
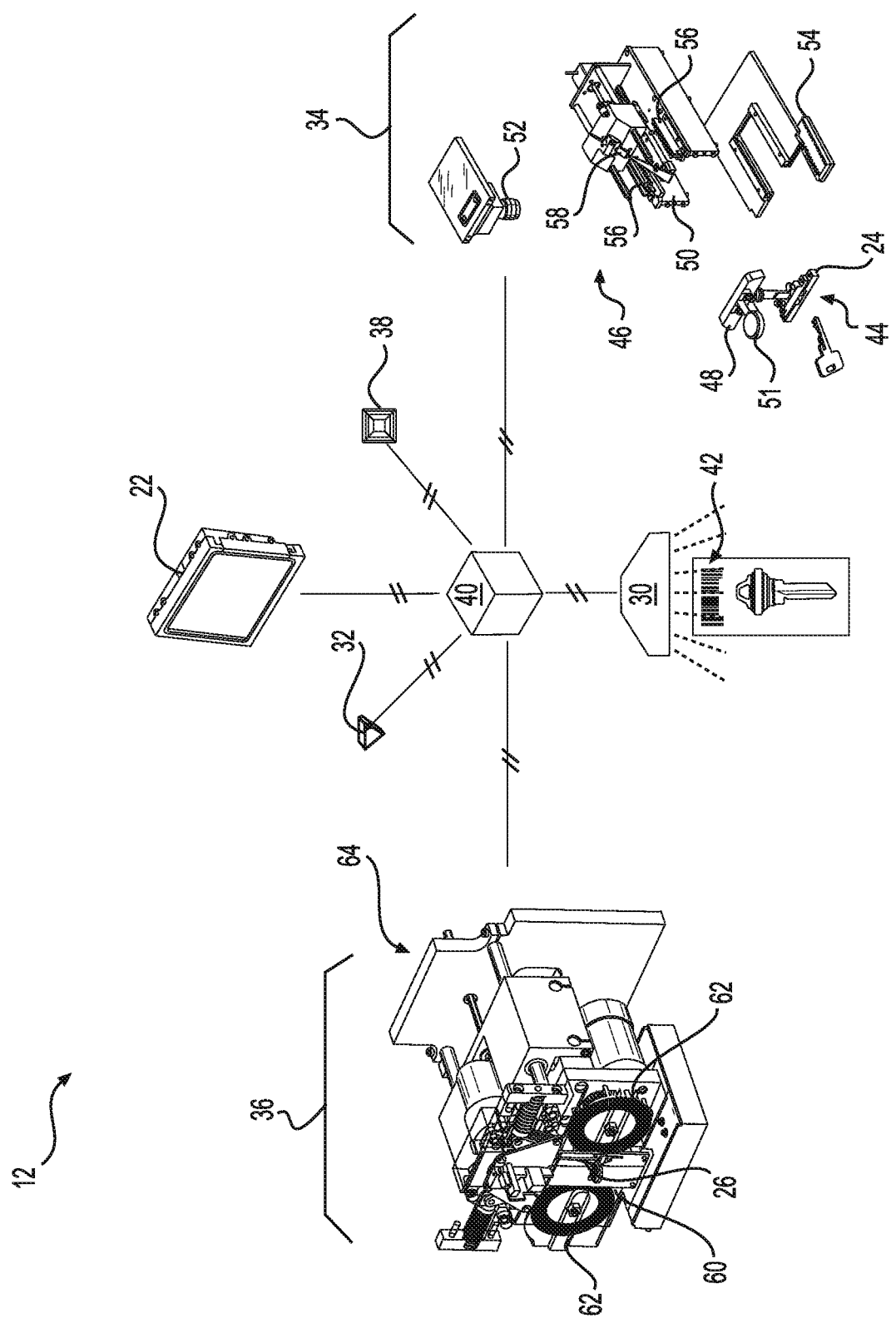
FIG. 3 is a control diagram of the key making machine of FIG. 2.

A diagrammatic illustration of machine 12 is provided in FIG. 3. As shown in this figure, machine 12 may be generally modular and include, among other things, an identification module 34 configured to receive the shank end of an existing key inserted through slot 24, at least one fabrication module 36 configured to receive the shank end of a key blank inserted through slot 26, a transponder sensor/cloner 38 associated with transponder section 28, and a controller 40. Controller 40 may communicate with each of the other components, as well as with display 22, reader 30, and indicator light(s) 32 to regulate the key duplication process. Although the inter-component communications shown in FIG. 3 are illustrated as wired connections, it is contemplated that some or all of these communications could be wireless (e.g., Bluetooth, cellular, infrared, radio, Wi-Fi, etc.), if desired. It is further contemplated that machine 12 could be equipped with a router or cellular modem for communication with another machine 12, a back office, a service tool, etc.

As described above, display 22 may provide queues to the user of machine 12 regarding the key duplication process. These queues may include, among other things, when, where, and how to insert the existing key and the key blank into machine 12. For example, display 22 may have a graphical user interface (GUI) that shows an image of the outside of machine 12, along with highlighting of the active slot (i.e., slot 24 or slot 26) that should be used for key insertion. In another example, controller 40 may correlate images on display 22 with illumination of particular indicator lights 32, thereby guiding the user to the correct slot. Further, a color, intensity, and/or frequency of light illumination may vary based on a degree of key insertion. For example, a particular indicator light 32 could initially illuminate in a red color, attracting the attention of the user to the corresponding slot. Then, as the user inserts the existing key or the key blank into that slot, the particular indicator light 32 could illuminate in a yellow color, followed by green when the key is fully and properly inserted. Other illumination strategies may also be employed.

In some embodiments, display 22 may additionally allow the user to input instructions, make selections, and/or answer questions regarding a desired duplication event. The instructions may include, for example, a number of duplicate keys to be produced, a desired pick-up time, a user's name, a desired delivery address, key identification information, a desire for duplication information to be stored for future reference, etc. The questions asked of the user may include for example, a make, model, and/or year of an associated car that the existing key corresponds with; a type and/or brand of lock to which the existing key belongs; and whether the existing key is a transponder key. The instructions, selections, and/or questions, as well as corresponding responses, may be communicated visually, audibly, and/or tactilely via display 22, as desired. For example, display 22 may be a touch screen and/or include another input device such as a key board, a mouse, a light pen, or a microphone that receives input from the user. Information received via display 22 may be directed to controller 40 for further processing, and controller 40 may respond to the customer via display 22.

Reader 30 may be configured to detect and read an index 42 associated with the key blanks of inventory 14. In one example, each index 42 is a unique barcode printed on a card to which each key blank is affixed, and corresponds with information stored in a memory of controller 40. For example, the barcode could correspond with an identity of the affixed key blank and/or a cost associated with using the affixed key blank in a duplication process. It is contemplated that the barcode (or another index 42) could alternatively be located directly on the key blank, if desired. Signals generated by reader 30 may be directed to controller 40 for comparison of the stored identity with an expected identity of a correct key blank. If the identity associated with index 42 does not correspond with the expected identity of the correct key blank, controller 40 may then cause display 22 to alert the user that the selected key blank is incorrect.

Identification module 34 may be configured to detect, identify, and/or measure distinguishing characteristics of the existing key inserted through slot 24. Although identification module 34 is shown in FIG. 2 as being co-located within a common housing, it is contemplated that identification module 34 could alternatively be housed separately and positioned near (e.g., adjacent and facing in the same or another direction as) or remote from fabrication module 36, as desired. Identification module 34 may include, among other things, a key receiving assembly 44 and an imaging system 46. Key receiving assembly 44 may be configured to receive an existing key in a particular orientation (e.g., lying horizontally with the shank thereof pointed inward toward the module) and at a particular location. Imaging system 46 may be configured to generate images of the existing key (or portions thereof) after it is received within key receiving assembly 44, and to direct data associated with the images to controller 40.

An exemplary embodiment of key receiving assembly 44 is shown in FIG. 3 as having a clamp 48 located immediately adjacent slot 24, and a guide 50 positioned at a side of clamp 48 opposite slot 24. Each of these components may cooperate to receive an existing key as the existing key is inserted by the user shank-first through slot 24. For example, side edges of slot 24 may be beveled inward toward a general center such that, as the existing key is inserted, the head of the existing key may engage the bevels and be urged toward the center (i.e., toward greater alignment with guide 50). Guide 50 may slide from clamp 48 inward to a desired imaging position during and/or after insertion of the existing key through slot 24. Clamp 48 may be spring-biased to secure the existing key in place during imaging, and a mechanical advantage may be provided to help reduce the effort required from the operator to insert the existing key through slot 24. In the disclosed embodiment, the mechanical advantage is provided by way of a lever arm 51.

Imaging system 46 may be a vision-based system employing one or more sources of visible and/or invisible light, and a receiver. The receiver may be, for example, a camera 52 that is located to any side of the existing key during imaging. Camera 52 may be configured to capture images of the existing key, while the light sources are selectively turned on and off. In the disclosed example, the light sources are "back lights" 54 configured to shine directly or indirectly toward the existing key from a side opposite (e.g., from below) camera 52. Camera 52, at this time, may capture a silhouette image of the existing key showing an exterior edge outline of the existing key and a location of reference features of the existing key (e.g., of shoulders and/or a tip of the existing key). Signals generated by camera 52 may be directed to controller 40 for further processing.

In another example, imaging system 46 may include one or more "side lights" 56 and/or a laser 58. Side lights 56 may be configured to shine light onto the existing key, one at a time, from an oblique side angle. During activation of each side light 56, camera 52 may be used to generate an image of the existing key showing an interior edge outline of notches milled into a center of the existing key. Laser 58 may be configured to scan the existing key while camera 52 generates one or more transverse stripe images. These additional signals generated by camera 52 may also be directed to controller 40 for further processing.

Fabrication module 36 may include, among other things, a receiving unit 60, and one or more cutting wheels 62 movable relative to receiving unit 60 via a gantry 64. The key blank retrieved by the user from inventory 14 based on image data captured via identification module 34 may be inserted through slot 26 into receiving unit 60. After being accepted by receiving unit 60 (e.g., after the shank end of the key blank has passed through slot 26), cutting wheel(s) 62 and gantry 64 may be selectively activated to produce desired features within the key blank.

Receiving unit 60 may have any configuration known in the art for receiving, clamping, and/or positioning the inserted key blank relative to cutting wheels 62. In one embodiment, receiving unit 60 includes jaws that are spring-biased toward each other to sandwich the key blank therebetween, and/or a clamp that is movable to secure the key blank once positioned. In some embodiments, a sensor may be used to measure a shank length of the key blank during insertion, the length being subsequently used by controller 40 as a way to confirm proper placement of the key blank. Once the key blank has been placed at a desired cutting location, the clamp may be actuated to push down on only the key blank. Thereafter, the jaws may be completely withdrawn from the key blank, exposing the shank of the key blank to cutting wheels 62.

Cutting wheels 62 may be used to make notches in one or both shank edges of the key blank. During fabrication of the notches, one or more motors connected to cutting wheels 62 may be selectively activated, and a lead screw of gantry 64 may be driven in an X-direction to move cutting wheels 62 into and out of the shank along the length or Y-direction of the key blank. The amount of movement in the X-direction at a given position in the Y-direction may be controlled based on the pattern of existing notches measured in the existing key by identification module 34. For a singled-edge key, only one of cutting wheels 62 may be used at one side of the key blank. For a dual-edge key, both cutting wheels 62 may be used at the same time or at different times to create notches in opposing sides of the key blank. It is contemplated that some fabrications modules 36 may have only one cutting wheel 62, while other fabrication modules 36 may include the two cutting wheels 62 described above. In particular, some systems may be designed to cut only a single edge into a key blank, while other systems may be designed to cut dual edges. In fact, it may be possible for a single fabrication module 36 to include both types of systems. Any configuration may be possible.

As discussed above, it may be possible for the existing key that the user wishes to duplicate to be embedded with or otherwise include a transponder that enables activation of an associated lock (e.g., an ignition lock in a vehicle). In these situations, it may be desirable to code a new duplicate key (i.e., the key blank notched by machine 12) to match the existing key with the same transponder code to ensure that the duplicate key functions in the same manner as the existing key. In the disclosed embodiment, the transponder code in the existing key can be detected and read at sensor/cloner 38. And after fabricating notches into the shank of the appropriate key blank, the same code may be cloned within the transponder of the new key at sensor/cloner 38. In the disclosed embodiment, sensing and cloning are performed by the same device and at the same location on machine 12. It is contemplated, however, that different devices located together or separately may alternatively be used to perform these functions, if desired.

Controller 40 may embody a single microprocessor or multiple microprocessors that include a means for controlling operations of machine 12. Numerous commercially available microprocessors can be configured to perform the functions of controller 40. Controller 40 may include all the components required to run an application such as, for example, a memory, a secondary storage device, and a processor, such as a central processing unit or any other means known in the art for controlling display 22, reader 30, indicator lights 32, identification module 34, fabrication module 36, and transponder sensor/cloner 38. Various other known circuits may be associated with controller 40, including power supply circuitry, signal-conditioning circuitry, solenoid driver circuitry, communication circuitry, switching circuitry, and other appropriate circuitry.

In some embodiments, machine 12 may also include a means for receiving payment from the user. These means may include, for example, a coin operated mechanism, a bill receiver, a credit card reader, and/or a receipt reader (e.g., a barcode reader configured to recognize a previous payment having already been received at another location and/or time). The means for receiving payment may be located anywhere on machine 12, and be capable of directing signals associated with the payment to controller 40 (or elsewhere) for further processing.

Figure 4:
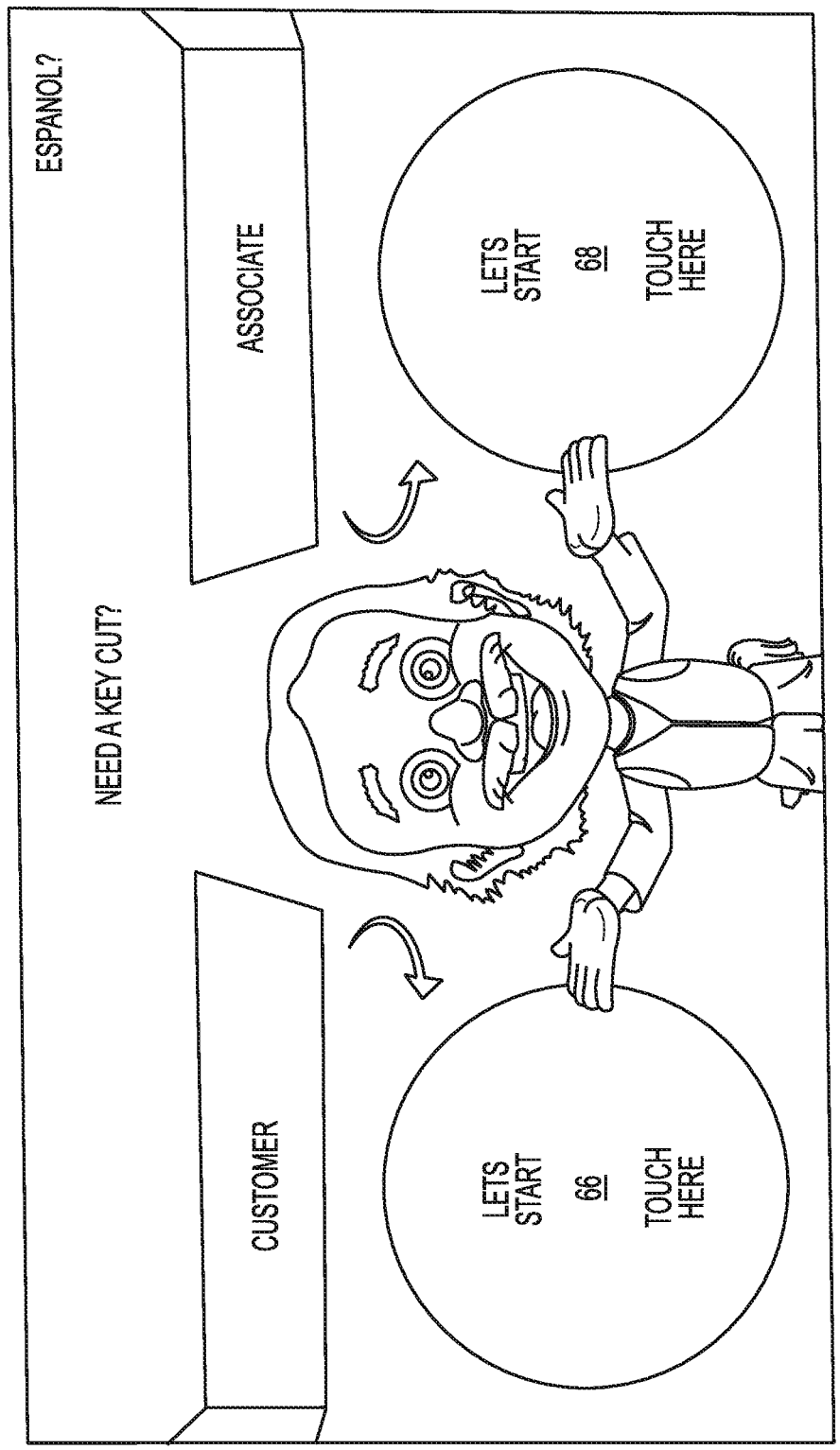
FIG. 4 is an exemplary disclosed graphical user interface associated with the key duplication machine of FIG. 2.
Figure 5:
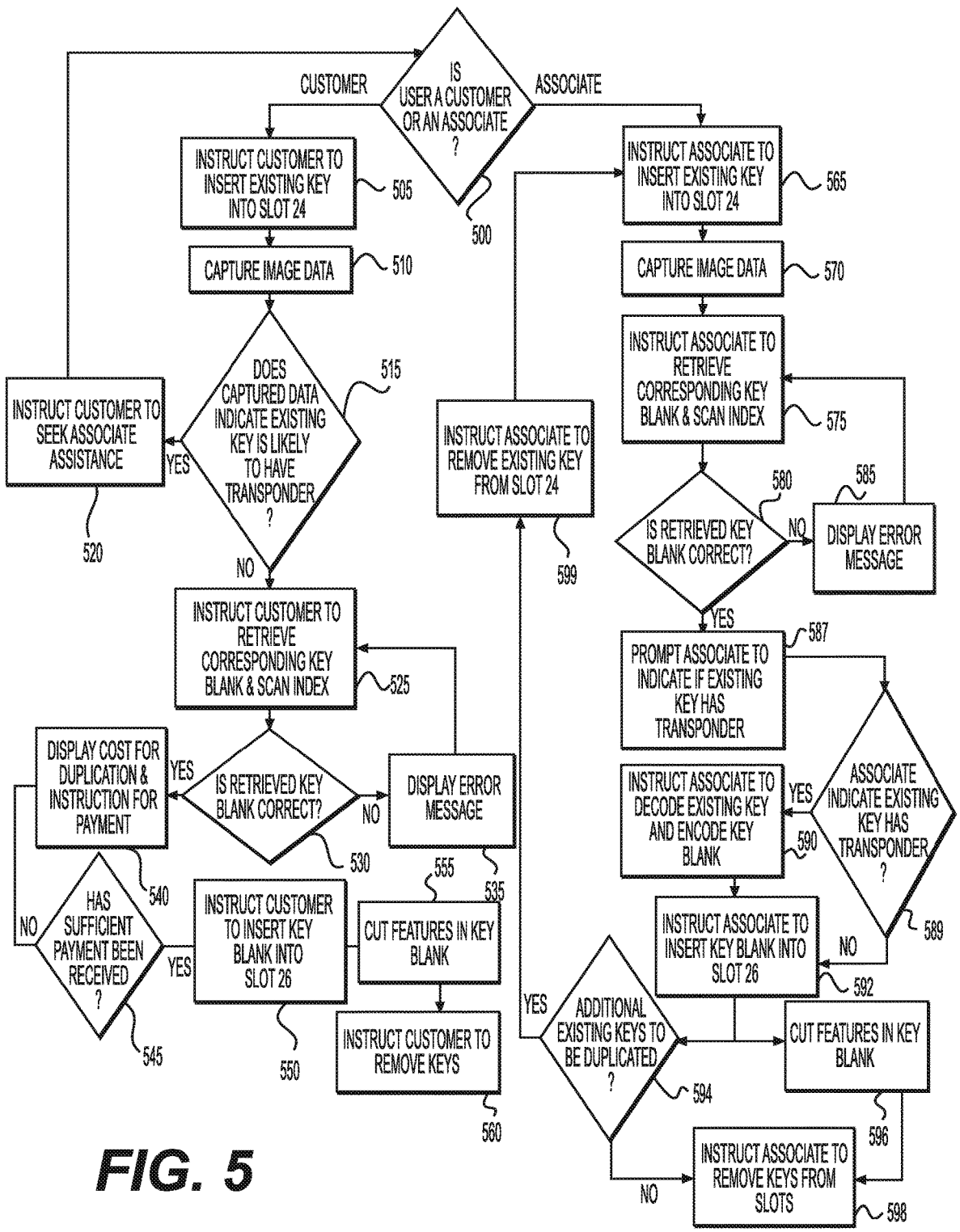
FIG. 5 is a flowchart depicting an exemplary process of duplicating an existing key using the key duplication machine of FIG. 2.

FIG. 4 illustrates an exemplary graphical user interface that may be shown on display 22 during a duplication process that is implemented by controller 40 and depicted in FIG. 5. FIGS. 4 and 5 will be described in more detail in the following section to further illustrate the disclosed concepts.

INDUSTRIAL APPLICABILITY

The disclosed key duplication machine 12 may be utilized to duplicate an existing key from a key blank stored in inventory 14. The disclosed duplication machine 12 may be easy to use by both an untrained customer and a retail store sales employee. An exemplary operation of the disclosed key duplication machine 12 will now be described with reference to FIGS. 4 and 5.

To begin the duplication process, a user (e.g., the customer or the sales employee) may approach machine 12 and be greeted by a message on display 22. FIG. 4 represents one such message that may be shown on display 22 at this time. As seen in FIG. 4, the greeting message shown on display 22 may ask the user to indicate if the user is a customer or an employee, and provide a way for the user to respond. Specifically, the user may touch one of two designated areas (e.g., a customer area 66 or an employee area 68) of display 22 corresponding to the correct answer.

As seen in FIG. 5, controller 40 may determine the response provided by the user (Step 500), and selectively implement one of two available modes of operation based on the response. These modes of operation may include a customer mode of operation and an associate mode of operation, wherein the two modes of operation have different functionality. In the disclosed embodiment, the customer mode of operation has limited functionality, when compared to the associate mode of operation. It is contemplated, however, that more than two modes of operation may be available and/or that the customer mode of operation could have greater functionality than the remaining mode(s), if desired.

When area 66 of the GUI shown on display 22 has been touched, controller 40 may instruct the customer to insert the existing key to be duplicated into slot 24 of identification module 34 (Step 505). Part of this instruction may include an animation of the insertion action shown on display 22, and/or illumination of the corresponding indicator light 32 located adjacent slot 24. The customer may need to press on lever arm 51 at this time, in order to facilitate insertion of the existing key. In some embodiments, the instruction provided by controller 40 may show how to use lever arm 51. After successful insertion of the existing key into slot 24 (e.g., after the corresponding indicator light 32 turns green), the customer may release lever arm 51. Controller 40 may then trigger camera 52 to capture image data associated with the existing key (Step 510).

Based on the image data, controller 40 may determine if the existing key is likely to include a transponder (Step 515). This likelihood may be determined based on a shape, type, size, etc. of the existing key, as recognized by controller 40 from the captured image data. In particular, the image data captured by camera 52 may be compared to image data associated with known transponder keys stored in memory. When the inserted existing key is determined by controller 40 likely to be a transponder key (step 515:Y), controller 40 may relay that information to the customer via display 22, and instruct the customer to seek assistance from a sales employee (Step 520). In the disclosed embodiment, this results in termination of the duplication process, and control returns from step 520 to step 500.

However, when controller 40 determines that the existing key inserted into slot 24 is not likely to be a transponder key (step 515:N), controller 40 may instead instruct the customer to retrieve a corresponding key blank from inventory 14 and to scan index 42 with reader 30 (Step 525). As in step 505 described above, the instruction of step 525 may include use of animation and/or indicator light illumination, if desired. The information corresponding to the scanned index 42 may then be compared with information corresponding to a correct or intended key blank to determine if the retrieved key blank is the correct key blank (Step 530). If the retrieved key blank is not the correct key blank (step 530:N), controller 40 may cause an error message to be shown on display 22 (Step 535), and control may return to step 525.

It is contemplated that the customer may have a key that is not within the capabilities of machine 12 to duplicate. In this situation, when the customer inserts the existing key at step 505, the customer may be informed of the inability to duplicate the key or instructed to see associate assistance. This may occur even when the existing key is not a transponder key.

At step 530, when controller 40 determines that the retrieved key blank is the correct key blank (step 530:Y), controller 40 may display a cost for duplicating the existing key using the retrieved key blank (Step 540). In addition, in some embodiments, controller 40 may provide instruction for making payment at step 540. The instruction could include use of a built-in payment mechanism, scanning of a payment receipt, wireless payment, or payment in another form. The process of key duplication may then pause until sufficient payment has been received. That is, controller 40 may determine if payment has been received (Step 545), and loop back through step 540 until this condition becomes true. This may inhibit fabrication by a customer of a key that has not yet been paid for. After payment is received, controller 40 may instruct the customer to insert the retrieved key blank into slot 26 of fabrication module 36 (Step 550), and cause fabrication module 36 to initiate cutting of the features of the existing key into the key blank (Step 555). After completion of the cutting process, controller 40 may instruct the customer via display 22 to remove all keys (i.e., the existing key and the newly cut key) from slots 24 and 26 (Step 560).

Returning to step 500, when the user touches area 68 of the GUI shown on display 22, controller 40 may instruct the sales employee to insert the existing key into slot 24 (Step 565) and then trigger camera 52 to capture image data (Step 570). These steps may be substantially identical to steps 505 and 510, respectively, that are described above. However, instead of automatically determining, based on the image data, if the existing key is likely to have a transponder, controller 40 may instead instruct the employee to retrieve the corresponding key blank and scan index 42 (Step 575). That is, the employee may be allowed to proceed with the process of FIG. 5, regardless of the existing key having a transponder. Controller 40 may then determine if the retrieved key blank is correct (Step 580), and display an error message if the retrieved key blank is incorrect (Step 585). Steps 575-585 may be substantially identical to steps 525-535 described above.

Following step 580, when controller 40 determines that the key blank retrieved by the sales employee is the correct key blank corresponding to the existing key inserted into slot 24 (step 580:Y), controller 40 may prompt the employee to indicate if the existing key has a transponder (Step 587). In other words, controller 40 may rely on the training of the employee when determining if the existing key has a transponder. In some embodiments, the employee may be unsure of the existence of the transponder, and may manually move the existing key past transponder sensor/cloner 38 in order to confirm such existence. It is contemplated that indicator light 32 located proximate transponder sensor/cloner 38 could automatically illuminate when the transponder is present within the existing key and the existing key is moved past transponder sensor/cloner 38. Other methods of manually and/or automatically determining the existence of the transponder may also be utilized, if desired.

After prompting the employee for input at step 587, controller 40 may determine if the subsequent response from the employee indicates the existing key is a transponder key (Step 589). When the existing key is indicated as being a transponder key (step 589:Y), controller 40 may instruct the employee to encode the retrieved key blank with the same code found in the existing key (Step 590), and then to insert the key blank into slot 26 (Step 592). When the existing key is indicated as not being a transponder key (step 589:N), control may proceed from step 589 directly to step 592 (i.e., control may bypass step 590).

Following step 592, controller 40 may simultaneously perform two different functions. Specifically, controller 40 may be configured to cause fabrication module 36 to initiate cutting of features into the key blank (Step 596—substantially identical to step 555) and also to determine if additional existing keys are to be duplicated (Step 594). Controller 40 may prompt the employee at this time to make the determination of step 594, or the employee may have already entered the information at another time during the process (e.g., at a beginning of the process, the employee may have indicated that multiple existing keys required duplication). If no additional existing keys are to be duplicated (step 594:N), and after completion of the feature cutting procedure, controller 40 may instruct the employee to remove all keys from slots 24 and 26 (Step 598—substantially identical to step 560). However, if additional existing keys are to be duplicated, control may instead move from step 594 to step 599, at which the employee is instructed by controller 40 to remove only the existing key from slot 24. Control may then return from step 599 to step 565. This may allow for images of a second existing key to be captured at about the same time that features of the first existing key are being cut into the corresponding key blank, which could save time and increase profits associated with the duplication process.

It should be noted that one or more of the steps shown in FIG. 5 may be followed in an order different than described above, if desired. For example, step 587, step 589, and part of step 590 (i.e., the decoding part of step 590) could be completed at any time after completion of step 500. Other steps of FIG. 5 could also be rearranged, omitted, or added, if desired. For example, it should be noted that the depicted process used by an employee does not involve payment for the duplication process. That is, the employee may be allowed to duplicate a key regardless of payment being received. It is contemplated, however, that steps similar to steps 540 and 545 may be followed by the employee, if desired.

The disclosed key making machine 12 may allow for the making of a greater variety of keys by a broader spectrum of users. Specifically, customers may utilize machine 12 to make non-transponder types of keys having any configuration available in inventory 14. In addition, sales employees may utilize machine 12 to make the same keys available to a customer, as well as transponder keys. This may reduce a floor space consumed by machine 12 within the retail environment, and help to boost profitability and customer satisfaction. In addition, because the variety of keys that machine 12 may duplicate is not limited to a number of key blanks that can be stored inside of machine 12, the use of machine 12 may be expanded.

It will be apparent to those skilled in the art that various modifications and variations can be made to the disclosed key making machine. Other embodiments will be apparent to those skilled in the art from consideration of the specification and practice of the disclosed key making machine. For example, although the two operating modes of machine 12 are described as being selectively implemented based on input from a user, it is contemplated that machine 12 could be configured to only operate in the customer mode, only operate in the associated mode, and/or to only operate in a hybrid mode (i.e., a combination of modes requiring input from the customer and the associate). It is intended that the specification and examples be considered as exemplary only, with a true scope being indicated by the following claims and their equivalents.

What is claimed is:

1. A method of duplicating features of an existing key within a key blank, the method comprising:
    capturing data associated with the features of the existing key using an identification module;
    fabricating the features in the key blank based on the captured data using a fabrication module;
    receiving input from a user indicative of the user being a customer or a store employee;

selectively implementing one of a first mode of operation or a second mode of operation based on the input identifying a type of the user, and reading an index associated with the key blank, wherein the first mode of operation corresponds to the user being the customer, and the second mode of operation corresponds to the user being the store employee, during operation in the first mode, determining a cost associated with the duplicating of the existing key based on the reading of the index, and further during operation in the first mode, only fabricating the features in the key blank after payment in an amount at least equal to the cost is received from the user, and during operation in the second mode, fabricating the features in the key blank occurs regardless of whether payment is received.

2. The method of claim 1, wherein:

the first mode of operation has limited functionality compared to the second mode of operation.

3. The method of claim 1, wherein:

during operation in the first mode, the method further comprises inhibiting duplication of the existing key when the existing key has a transponder.

4. The method of claim 3, wherein:

during operation in the first mode, the method further comprises automatically making a determination that the existing key is likely to have the transponder based on the data.

5. The method of claim 4, further comprising:

providing user instruction indicating that the existing key is likely to have the transponder and cannot be duplicated.

6. The method of claim 3, wherein:

during operation in the second mode, the method further comprises allowing duplication of the existing key when the existing key has the transponder.

7. The method of claim 6, wherein:

during operation in the second mode, the method further comprises prompting the user to provide input indicative of whether the existing key has the transponder.

8. The method of claim 7, further comprising:

sensing whether the existing key has the transponder.

9. The method of claim 1, wherein:

the existing key is a first existing key;

the key blank is a first key blank corresponding to the first existing key; and during operation in the first mode, the method further comprises inhibiting capturing of data associated with a second existing key during cutting of the first key blank.

10. The method of claim 1, wherein:

the existing key is a first existing key;

the key blank is a first key blank corresponding to the first existing key; and during operation in the second mode, the method further comprises capturing data associated with a second existing key during cutting of the first key blank.

11. The method of claim 1, further comprising:

instructing the user to select the key blank from among a plurality of available key blanks based on the index associated with the key blank; and confirming that the user has selected the key blank corresponding to the existing key based on the reading of the index.

12. The method of claim 1, further comprising:

selectively illuminating at least one indicator light based on insertion of the existing key or the key blank into a corresponding slot.

13. A method for duplicating features of an existing key within a key blank, the method comprising:

capturing data associated with the features of the existing key using an identification module;

cutting the features in the key blank based on the captured data using a fabrication module;

entering an input using a user input device; and configuring a controller, the controller being in communication with the identification module, the fabrication module, and the user input device, the controller being configured to:

regulate operation of the identification module and the fabrication module;

receive, via the user input device, the input from a user, the input being indicative of the user being a first type of user or a second type of user; and selectively implement one of a first mode of operation or a second mode of operation based on the input by:

inhibiting duplication of the existing key with the fabrication module when the existing key has a transponder during operation in the first mode; and implementing duplication of the existing key with the fabrication module when the existing key has the transponder during operation in the second mode.

14. The method of claim 13, wherein:

the first type of user is a customer; and the second type of user is a store employee.

15. The method of claim 13, wherein:

during operation in the first mode, automatically making a determination that the existing key is likely to have the transponder based on the data captured by the identification module.

16. The method of claim 15, further comprising:

providing, on a display, a user instruction indicating that the existing key is likely to have the transponder and cannot be duplicated.

17. The method of claim 13, wherein:

during operation in the second mode, prompting the user to provide additional input indicative of whether the existing key has the transponder.

18. The method of claim 17, further comprising:

determining, using a transponder sensor, whether the existing key has the transponder based on signals generated by the transponder sensor.

19. The method of claim 18, further comprising:

instructing the user via a display to pass the existing key into proximity of the transponder sensor when the user indicates the existing key has the transponder.

* * * * *